United States Patent [19]

Tahara et al.

[11] Patent Number: 4,711,121
[45] Date of Patent: Dec. 8, 1987

[54] METHOD AND EQUIPMENT FOR DETECTING PINHOLES OF HOLLOW FILAMENT

[75] Inventors: Yasuteru Tahara; Kazuyoshi Koike, both of Ohtake, Japan

[73] Assignee: Mitsubishi Rayon Co., Ltd., Tokyo, Japan

[21] Appl. No.: 587,430

[22] Filed: Mar. 8, 1984

[51] Int. Cl.⁴ .............................................. G01M 3/00
[52] U.S. Cl. ........................................ 73/37.7; 73/160
[58] Field of Search ................................. 73/37.7, 160

[56] References Cited

U.S. PATENT DOCUMENTS 4,357,826 11/1982 Tahara et al. ...................... 73/37.7

Primary Examiner—Stewart J. Levy
Assistant Examiner—Joseph W. Roskos
Attorney, Agent, or Firm—Armstrong, Nikaido, Marmelstein & Kubovcik

[57] ABSTRACT

An improved method and an equipment for detecting a pinhole in hollow filament, wherein the improvement comprises passing the hollow filament through a liquid maintained at a pressure higher than that of the gas in the interior of said hollow filament to allow the liquid to intrude through the pinhole into the interior of the hollow filament and detecting the intruded liquid.

4 Claims, 3 Drawing Figures

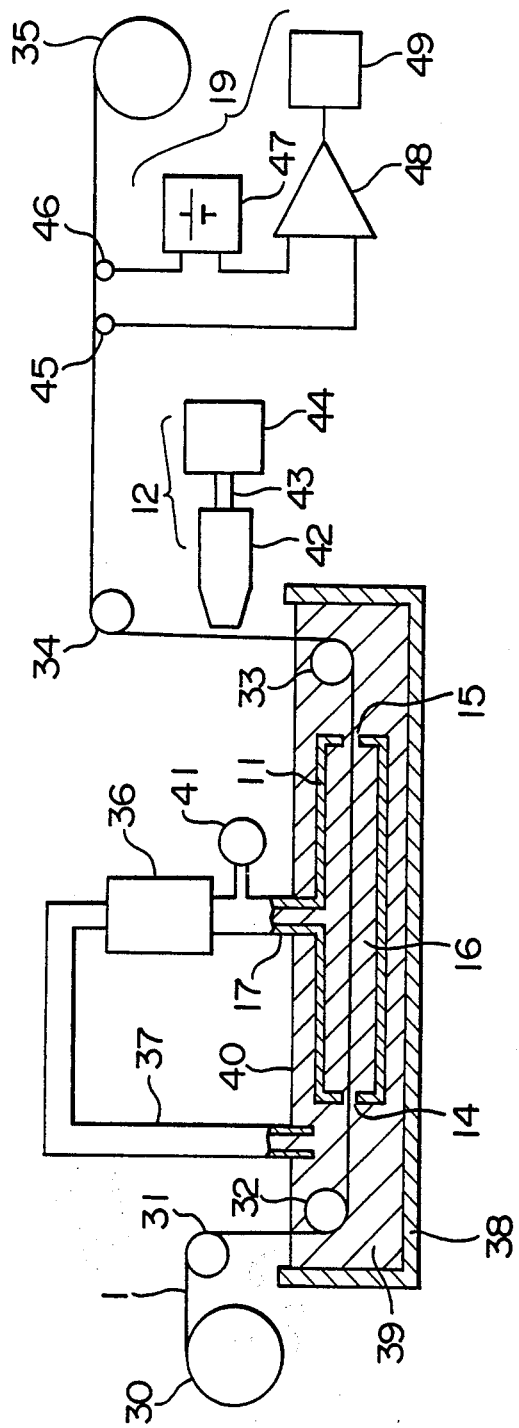
F I G. 3

METHOD AND EQUIPMENT FOR DETECTING PINHOLES OF HOLLOW FILAMENT

This invention relates to a method and equipment for detecting pinholes of porous hollow filament.

The porous hollow filament (hereinafter referred to briefly as hollow filament) is generally fabricated into a bundle assembly and is employed as a filter unit in various uses such as artificial internal organs, waste water treatment, gas separation and the like. When the hollow filament is used as a filter unit, if there exist such defects as cracks, clefts and small holes (hereinafter these defects are referred to collectively as pinholes) which extend from the interior to the exterior of the hollow filament, the untreated liquid (or gas) will pass through the pinholes and get mixed with the treated liquid (or gas), resulting in an increase in the quantity of substances which ought to be removed from the permeated liquid (or gas); such a defective filter unit is unsuitable for such uses as medical use where a strictly selective permeability is required. It is, therefore, necessary to examine the fabricated filter unit for the presence of pinholes. If a pinhole is detected, the filter unit is repaired or discarded. In order to improve the fabrication yield, it is important to obtain hollow filament free of pinholes and to fabricate the filter unit without injuring the filament, but it is difficult to produce hollow filament entirely free of pinhole. If it is possible to detect the pinhole by nondestructive 100% inspection of the hollow filament and remove the detected pinholes, there will be obtained hollow filament substantially free of pinhole. For this purpose, there is a demand for the development of a pinhole detector which can be integrated into the production line of hollow filament. Under the circumstances, the present inventors conducted an extensive study and, as a result, has accomplished the present invention.

A known method for the nondestructive detection of pinholes in hollow filaments which are fed continuously is the method described in Japanese Patent Application "Kokai" (Laid-open) No. 83,737/79 corresponding to convention U.S. application Ser. No. 163,011, filed June 25, 1980, now U.S. Pat. No. 4,357,826, dated Nov. 9, 1982. This method is applicable to the case where the hollow space of the filament is filled with a liquid. The filled filament is passed through a pressurized gas to force the gas into the filled space of the filament through a pinhole so as to form bubbles which are detected in place of the direct detection of pinhole. This known method requires the hollow filament to be filled with a liquid, but it is not easy to force a liquid into the filament without entrapping gas bubbles. Hollow filament filled with a liquid is produced as such only by the wet spinning which, however, can be used in rare cases. Moreover, after the pinhole test the liquid must be removed from inside of the filament, but the complete removal is not easy.

This invention provides a method for detecting pinholes of hollow filament, in which the above-mentioned disadvantages of the conventional method have been eliminated, and also provides an equipment for practicing the method. The present method comprises (1) passing a continuously produced or delivered hollow filament containing no liquid in the hollow space through a liquid intrusion vessel filled with a liquid maintained at a pressure higher than that of the internal pressure of the hollow filament, thereby to allow the liquid to intrude through a pinhole, if any, into the hollow space of the filament, (2) then passing the filament through a liquid removing device to remove, if not naturally removed, the adhered liquid, and finally (3) passing the filament through a detector which detects the liquid intruded through the pinhole into the hollow space, thereby to detect indirectly the presence of a pinhole.

The method and equipment according to this invention is further described below in detail with reference to the accompanying drawings.

FIG. 3 is a partial sectional view representing one of the embodiments of the equipment for detecting a pinhole in hollow filament.

Figure 1:
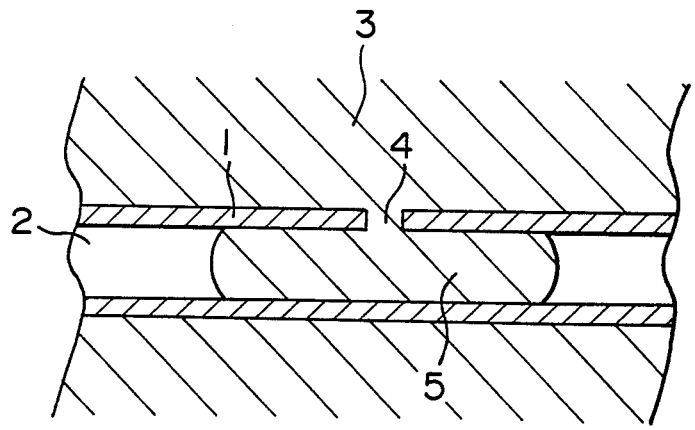
FIG. 1 is a schematic sectional view of the hollow filament with a liquid forced into the interior through a pinhole.

In the drawings the numerals denote the following:
1. Hollow filament.
2. Interior of the hollow filament.
3. Liquid at a pressure higher than that of the interior of the hollow filament.
4. Pinhole.
5. Liquid forced into the interior.
10. Feeder of the hollow filament.
11. Liquid intrusion vessel.
12. Device for removing adhered water.
13. Take-up device.
14. Hollow filament inlet to the intrusion vessel.
15. Hollow filament outlet from the intrusion vessel.
16. Liquid at higher pressure.
17. Conduit.
18. Liquid supply source.
19. Detector for the intruded liquid.
30. Feed bobbin.
31, 32, 33 and 34. Guide rolls.
35. Take-up bobbin.
36. Pump.
37. Suction pipe.
38. Water vessel.
39. Water in the water vessel.
40. Water surface.
41. Manometer.
42. Air nozzle.
43. Pipe.
44. Compressor.
45. Electrode.
46. Electrode.
47. DC source.
48. Current detector.
49. Alarm device.

At first, the technique of forcing a liquid through a pinhole into the interior of a hollow filament in the method of this invention is described. As shown schematically in FIG. 1, when a hollow filament 1 is placed in a liquid 3 maintained at a pressure higher than that of the gas 2 inside the hollow filament, the liquid is forced through any pinhole 4 which might be in the wall of the hollow filament and into the hollow interior space of the filament, forming a liquid column 5 in cylindrical form. In the case where a continuous hollow filament having a through-hole in the filament wall passes at a constant speed through a liquid vessel maintained at a constant pressure, the quantity of intruded liquid varies with the size and shape of the hole. The quantity of a liquid intruded through a hole of the constant size depends upon the material of the hollow filament, type of the liquid, time of stay of the filament in the pressurized liquid, and the pressure applied to the liquid. Since the diameter of the hole through which a liquid is able to pass is determined by the magnitude of the contact angle between the liquid and the material of hollow filament as well as the pressure applied to the liquid, it is important to select the combination of the type and composition of test liquid and the pressure in accordance with the material of hollow filament and the size of pinhole to be detected. When these variables are set at proper values and are held constant, if there is no pinhole, the liquid will not intrude through the wall of porous hollow filament and if there is a pinhole of the size larger than a certain value, it is possible to allow the liquid to intrude through only such pinhole into the interior of hollow filament. It becomes possible, therefore, to determine indirectly the presence and locality of a pinhole by detecting with a proper means the liquid intruded into the interior of a hollow filament. It is also possible to use the measured quantity or length of the intruded liquid as a measure for the size of pinhole. It is further possible to detect only the pinhole of the size larger than a certain value by properly selecting the detection limit for the liquid.

The present method for detecting a pinhole of the hollow filament is described below with reference to FIG. 2. The hollow filament 1 continuously fed from a feeder 10 first passes through an intrusion vessel 11 where the liquid intrudes through a pinhole, if present, into the interior of hollow filament. The liquid adhered to the exterior surface, if not removed naturally, is then removed by means of a removing device 12. The travelling hollow filament passes through a detector 19 where the liquid intruded into the hollow filament is detected and then is rolled up by means of a take-up device 13. Thus, the present method is a method for detecting indirectly a pinhole by detecting the liquid intruded into the hollow filament.

Figure 2:
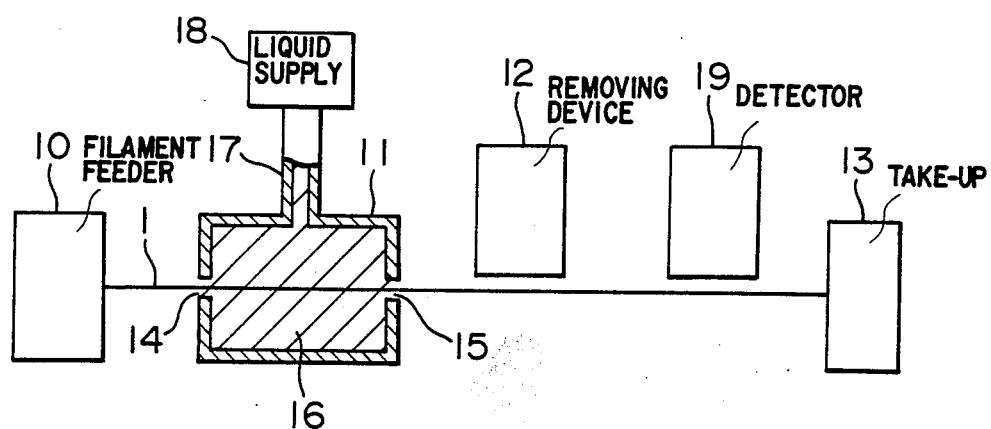
FIG. 2 is a partial sectional view of the assembly of constitutive elements of the equipment for detecting a pinhole of hollow filament.

In the following, each element of the assembly shown in FIG. 2 is described in detail. As the feeder 10, use may be made of a spinning unit for the hollow filament or a device which is able to feed the substantially continuous hollow filament, such as a delivery device carrying a bobbin around which the hollow filament has been wound. It is desirable to employ a feeder which operates in combination with the take-up device 13 so that the hollow filament may travel at a substantially constant speed. The intrusion vessel 11 is a container which holds a liquid 16 at a pressure higher than that of the interior of hollow filament and which is provided with an inlet and outlet for the hollow filament. At the inlet and outlet there is a clearance between the vessel and the travelling hollow filament. The vessel is connected through a conduit 17 to a liquid supply source 18 so that the pressure of the liquid 16 may be held at approximately constant level even when the liquid leaks continually out of the clearance.

It is also possible to apply a necessary pressure without employing a compression device such as a pump by providing guide rolls in the intrusion vessel 11, also providing the inlet 14 and outlet 15 in the upper part of the vessel walls, attaching vertical conduits above the inlet and outlet, and filling the conduits with water. In case of carrying out this method, hollow filament is introduced, through the vertical conduit on the inlet side, into the intrusion vessel and is drawn out, through the other conduit on the outlet side, from the intrusion vessel.

The removing device 12 is employed for the purpose of removing the liquid adhered to the exterior surface of hollow filament. For this purpose various methods are conceivable, such as, for example, blowing off by compressed air, wiping off with a sponge, cloth or the like to absorb the liquid, and blowing a hot air current to evaporate solely the adhered liquid. These methods may be used in combinations. In any way, a device having an ability sufficient for removing the liquid adhered to the exterior surface of the hollow filament so that the remaining liquid will not interfere with the detection of the liquid inside the filament may be used. It is possible, if necessary, to install the removing element in multiple stage unless the resulting unit becomes so effective as to remove the liquid intruded into the interior of hollow filament. The liquid removing device is not necessary in case the adhered liquid is removable, for example, by natural evaporation. As for the detector 19 to detect the liquid intruded into the interior of hollow filament, various types are conceivable, such as, for example, a device utilizing the change in electric resistance. Any type of the device may be used so far as the device is capable of detecting the liquid intruded into the interior of hollow filament. It is also possible to pick up the signal from the detector and operate an alarm device, a recorder or a marker.

As described above, in the present method, a hollow filament is passed through a vessel containing a pressurized liquid, thereby to allow the liquid to intrude through a pinhole into the interior of hollow filament to form a cylindrical column, and the liquid in cylindrical form is detected by a suitable means. By using such a method, since the size of a tiny pinhole is transcribed in an enlarged form into a cylindrical form of liquid, the pinhole can be detected easily and without failure, though indirectly.

The invention is illustrated below in further detail with reference to Example.

EXAMPLE

A bundle of 24 porous hollow filaments of polypropylene, each 250 $\mu$m in outer diameter and 25 $\mu$m in wall thickness (hereinafter referred to simply as polypropylene hollow filament), was used as specimen to be tested for pinhole. Water was used as a liquid to be forced through a pinhole into the interior of hollow filament. Since polypropylene is hydrophobic, the liquid does not intrude into the interior of hollow filament unless pressure is applied and the removal of the water adhered to the exterior surface is easy. As shown in FIG. 3, the polypropylene hollow filament 1 was fed continuously at a rate of about 10 m/minute from a bobbin 30 mounted on a derivery device. Guided by the guide rolls 31, 32, 33 and 34, the filament passed through a water intrusion vessel 11, a removing device 12 and a detector 19 and wound around a take-up bobbin 35. Guided by guide rolls 32 and 33, the travelling polypropylene hollow filament entered the intrusion vessel 11 through the inlet 14, passed through the water 16 maintained at a pressure of about 2 kg/cm$^2$, and left the vessel through the outlet 15. Since the water in the intrusion vessel leaked out of the clearances at the inlet 14 and the outlet 15, water was fed to the vessel through the conduit 17 from a pump 36 provided with a pressure regulator to maintain the pressure inside the intrusion vessel at a constant level. The feeding of water to the pump was performed by drawing the water 39 preserved in the water tank 38 through a suction pipe 37. If the operation continues for a long period of time, water may be suitably replenished from a water supply tube (not shown) to maintain the water level 40 approximately constant. 41 is a pressure gage. The length of the intrusion vessel was about 1 m.

The hollow filament past through the intrusion vessel was guided to travel upward by the rolls 33 and 34 while an air current having been blown from an air nozzle 42 against the filament to remove the water adhered to the exterior surface of the hollow filament. The air current was supplied through the pipe 43 from a compression pump 44. The adhered water was removed to an extent not to interfere with the detection of water in the interior of hollow filament.

The detection of water present in the interior of hollow filament was performed between the guide roll 34 and the take-up bobbin 35. 45 and 46 are a pair of rod-like electrodes, each 2 mm in diameter, which were disposed 10 mm apart and in contact with the travelling hollow filament at right angle and supported on an insulator (not shown). 47 is a DC source capable of supplying an electric current of 8 kV, the internal resistance being about 500 MΩ. 48 is a current detector. When there is no water in the interior of the hollow filament, no electric current was detected, whereas when the portion of hollow filament carrying in the interior a water column of cylindrical form, 10 mm or more in length, passed between the electrodes, an electric current of about 15 μA was detected by the detector 48 and the alarm device 49 was actuated, because since the wall of the polypropylene hollow filament was porous and 25 μm in thickness, an electric discharge took place between the electrodes. The insulation resistance of the water used in the present Example was $10^3$ Ω·cm. It was found desirable that the insulation resistance of water be $10^5$ Ω·cm or less for the normal operation of the current detector under the above conditions.

After the pinhole in the hollow filament had been indirectly detected as described above, the corresponding portion of the filament was examined under a microscope. There was found a pinhole together with a circular hole of about 30 μm in diameter produced by the electric discharge The minimum diameter of detected pinhole was about 10 μm. A filter unit was prepared from the hollow filament removed of the portion where an intruded liquid was detected. Upon performance test, the filter unit was found to be entirely free from damage and pinhole.

What is claimed is:

1. An improved method for detecting a pinhole in a hollow filament, wherein the improvement comprises passing the hollow filament through water maintained at a pressure higher than the pressure in the interior of said hollow filament to allow said water to intrude through any pinhole in said hollow filament and into the interior of the hollow filament and, through the detection of said intruded water in the interior of said hollow filament, detecting a pin hole in said hollow filament.

2. A method, as recited in claim 1, wherein said detection of said intruded water in the interior of said hollow filament is carried out by placing said hollow filament in an electric field and by detecting an electric current due to the electrical discharge generated at the portion of said hollow filament where said water intruded through a pinhole.

3. An equipment for detecting a pinhole in hollow filament, comprising, between a feeder of said hollow filament, and a take-up device therefor, (1) a water intrusion device wherein water is maintained at a pressure higher than the interior of said hollow filament to allow water to intrude into the interior of said hollow filament through any pinhole therein and (2) a detector for detecting water intruded into the interior of the hollow filament.

4. A equipment for detecting a pinhole in hollow filament according to claim 3, wherein the detector is provided with electrodes to detect a change in electric insulation resistance of said hollow filament when water is contained therein.

* * * * *